UNITED STATES PATENT OFFICE.

HORATIO REED, OF JERSEY CITY, NEW JERSEY.

IMPROVEMENT IN THE PROCESS OF MANUFACTURING ENAMELED FRUIT-JARS AND OTHER VESSELS.

Specification forming part of Letters Patent No. 37,591, dated February 3, 1863.

*To all whom it may concern:*

Be it known that I, HORATIO REED, of Jersey City, in the county of Hudson and State of New Jersey, have invented a new Process of Making Metallic Glass Self Sealing Preserve Cans, Jars, Bottles, Kettles, &c.; and I do hereby declare that the following is a full and exact description.

The nature of my invention is, in the first place, in making the glass of a soft pliable nature in the furnace, which is then taken out and rolled into proper shape upon smooth iron, thence blown into a round, thence oblong shape, thence inserted into the metallic can (the latter being heated to a red-hot state) and blown into shape of said metallic can, which adheres to the metallic metal and remains permanent.

What I claim as my invention is—

The lining of metallic can while in a red-hot state with glass which is blown in a hot state into a metallic can.

HORATIO REED.

Witnesses:
 THOMAS MOULDS,
 RONEY REED.